US008673131B2

(12) United States Patent
Gauthier et al.

(10) Patent No.: US 8,673,131 B2
(45) Date of Patent: Mar. 18, 2014

(54) INTEGRATED SEQUENCE OF METHODS FOR EXTRACTING AND PROCESSING EXTRA-HEAVY OR BITUMINOUS CRUDE OIL WITH $CO_2$ CAPTURE (75) Inventors: Thierry Gauthier, Brignais (FR); Ali Hoteit, Paris (FR); Ann Forret, Longes (FR)

(73) Assignees: IFP Energies Nouvelles, Rueil-Malmaison (FR); Total SA, Courbevoie (FR)

( * ) Notice: Subject to any disclaimer, the term of this patent is extended or adjusted under 35 U.S.C. 154(b) by 236 days.

(21) Appl. No.: 13/123,726

(22) PCT Filed: Oct. 21, 2009

(86) PCT No.: PCT/FR2009/001229
§ 371 (c)(1),
(2), (4) Date: Jun. 22, 2011

(87) PCT Pub. No.: WO2010/046562
PCT Pub. Date: Apr. 29, 2010

(65) Prior Publication Data
US 2011/0266196 A1 Nov. 3, 2011

(30) Foreign Application Priority Data

Oct. 24, 2008 (FR) ...................................... 08 05936

(51) Int. Cl.
*C10G 71/00* (2006.01)
(52) U.S. Cl.
USPC ................. 208/131; 208/45; 208/49; 208/58; 208/78; 208/216 PP; 208/309; 208/390; 252/373
(58) Field of Classification Search
USPC .............. 208/45, 49, 58, 78, 92, 131, 216 PP, 208/309, 390; 252/373
See application file for complete search history.

(56) References Cited

U.S. PATENT DOCUMENTS

| 4,098,674 A | 7/1978 | Rammler et al. |
| 4,399,314 A | 8/1983 | Child |
| 5,447,024 A | 9/1995 | Ishida et al. |
| 2005/0175533 A1 | 8/2005 | Thomas et al. |
| 2007/0045155 A1* | 3/2007 | Selmen et al. .................. 208/49 |
| 2011/0097673 A1* | 4/2011 | Forret et al. ........................ 431/2 |

FOREIGN PATENT DOCUMENTS

| FR | 2887557 | 12/2006 | |
| FR | 2930771 A1 * | 11/2009 | ............... C01B 3/44 |
| WO | WO2007/082089 | 7/2007 | |

* cited by examiner

*Primary Examiner* — Brian McCaig
(74) *Attorney, Agent, or Firm* — Antonelli, Terry, Stout & Kraus, LLP.

(57) ABSTRACT

The present invention relates to a method of preparing synthetic crude oil from a heavy crude reservoir, comprising: (a) extracting the heavy crude oil using a steam technology; (b) separating the crude extracted and the water; (c) separating the crude into at least one light cut and one heavy cut; (d) converting said heavy cut to a lighter product and a residue; (e) optionally, partially or totally hydroprocessing the converted product and/or the light cut(s) obtained upon separation (c); (f) burning and/or gasifying the conversion residue in the presence of metal oxides in at least one chemical looping cycle producing $CO_2$-concentrated fumes in order to allow $CO_2$ capture, the optionally hydroprocessed converted product and light separation cut(s) making up the synthetic crude oil, said combustion allowing to generate steam and/or electricity, and said gasification allowing to generate hydrogen, the steam and/or the electricity thus generated being used for extraction (a), and/or the electricity and/or the hydrogen thus generated being used for conversion (d) and/or hydroprocessing (e).

19 Claims, 3 Drawing Sheets

INTEGRATED SEQUENCE OF METHODS FOR EXTRACTING AND PROCESSING EXTRA-HEAVY OR BITUMINOUS CRUDE OIL WITH $CO_2$ CAPTURE

FIELD OF THE INVENTION

The invention relates to a method of preparing synthetic crude oil, at a minimized energy cost, from a heavy or bituminous crude reservoir.

More particularly, it relates to a integrated sequence of a heavy crude extraction method and of a method of processing this heavy crude extracted, comprising using at least one chemical loop for conversion residue combustion and/or gasification in order to minimize the outer energy supply and to facilitate capture of the $CO_2$ emitted while providing a synthetic crude of very satisfactory quality.

BACKGROUND OF THE INVENTION

Extra-heavy or bituminous crude oils, also referred to in the present application as heavy crudes or bitumens, represent considerable resources that are and will be increasingly developed. However, these crudes have physical properties, notably very high viscosity and density, which make their extraction, production, transport and processing difficult.

Such crudes can therefore not be extracted using conventional methods.

Extraction methods specific to this type of crude have thus been developed. One, suited for surface or shallow reservoirs, referred to as mining extraction method, consists in mixing sand with the crude to be extracted and in extracting the mixture of sand and crude mechanically. This mixture is then washed, separated and the lighter cuts are then upgraded.

For deeper reservoirs, this method is unsuitable and on-site production has to be assisted in order to make them mobile, i.e. decrease their viscosity so as to make extraction possible.

In order to decrease the viscosity, the ground is heated by steam injection and the crude thus made mobile can be extracted. These method's, referred to as steam-assisted gravity drainage or SAGD, or cyclic steam stimulation or CSS, are described in documents U.S. Pat. No. 4,344,485, U.S. Pat. No. 4,850,429 and U.S. Pat. No. 5,318,124. Although widely used, these methods involve the major drawback of consuming very large amounts of natural gas required for producing injected steam. Their profitability therefore greatly depends on the price of natural gas.

Besides, the crudes thus extracted exhibit high asphaltene and heteroatom (S, N, O, V, Ni, etc.) contents. They must therefore be processed in order to have synthetic crudes of satisfactory quality, i.e. with a viscosity and a density allowing pipeline transportation, and a low proportion of sulfur and other heteroatoms. The upgrading stages also consume large proportions of natural gas, which is notably necessary for hydrogen production through steam reforming of natural gas or methane.

In order to minimize this dependence on natural gas, U.S. Pat. No. 4,399,314 describes a method wherein a bitumen from a bituminous sand is subjected to hydroconversion, the hydroconversion residue is gasified with oxygen in order to produce a synthesis gas from which hydrogen is produced for the hydroconversion stage.

U.S. Pat. No. 6,357,526 provides a deasphalting method for recovering a deasphalted crude that constitutes the synthetic crude and the asphalt is burned to generate steam that is used in the SAGD extraction method. However, the synthetic crude obtained is not of good quality because it still contains many contaminants such as sulfur, nitrogen and metals.

There is therefore a real need for a method of preparing a synthetic crude from an extra-heavy or bituminous crude reservoir, allowing to obtain a quality synthetic crude whose dependence on the price of natural gas is decreased or even cancelled out.

Patent FR-2,887,557 provides a sequence of methods including the extraction and processing stages, combustion and/or gasification of the conversion residue allowing to generate energy in form of steam or electricity and/or hydrogen, the steam being then used for extraction and the hydrogen for processing by carrying out the stages described below.

This method allows to avoid using natural gas but it requires combustion and gasification of the residue. The combustion of petroleum residues using conventionally known methods is carried out by direct contact with air, which results in significant $CO_2$ emissions since the fumes generally contain of the order of 10 to 15% (by volume) of $CO_2$ diluted in the nitrogen in the air. It is also possible to use the new oxycombustion techniques to burn the residue. In fact, oxycombustion allows to produce $CO_2$-rich fumes (content above 90 vol. %) by contacting the residue only with oxygen that has been separated from air in an ASU (Air Separation Unit) beforehand. $CO_2$ capture is then facilitated. Compression of the fumes allows to directly consider reinjecting the fumes into a storage site. Unfortunately, an ASU requires a very high investment (above 100 million euros for a 350 t/h $O_2$ unit) and a high energy consumption. The result thereof is a decrease in the combustion cycle efficiency, from typically 47% to 50% for a conventional air combustion unit to 39% to 42% for a oxycombustion unit because of the energy consumption induced by the air separation unit. Gasification of the residue also requires an air separation unit (ASU) for introducing the purified oxygen. The same advantages and drawbacks are observed: the $CO_2$ can be readily captured in nitrogen-free fumes. However, the energy consumption induced by air separation is high.

Direct residue combustion by contacting a metallic oxide with the hydrocarbon in a chemical looping cycle is described in patent application FR-08/02,450.

It is then possible to directly produce combustion fumes containing more than 90 vol. % $CO_2$ without affecting the combustion cycle efficiency that remains close to 47 to 50%. In fact, the oxygen directly comes from the metallic oxide that circulates continuously between a hydrocarbon combustion zone and a reduction zone with contacting with air wherein the metal reduced after combustion is reoxidized. In the combustion zone, the fumes essentially contain $CO_2$ since it is not necessary to use air. In the reduction zone, the gaseous effluents consist of depleted air free of the oxygen captured by the metallic oxides. Circulation between the two zones occurs by means of conventional fluidized bed techniques. In order to carry out satisfactory combustion, it is desirable to operate the combustion and oxidation zones at temperatures ranging between 800° C. and 1100° C., preferably between 900° C. and 1000° C.

It is also possible to produce a mixture (CO, $H_2$) and therefore hydrogen by limiting the metallic oxide circulation between the two enclosures and by feeding steam into the combustion zone. It is thus possible, by means of a chemical looping cycle, to produce energy without significantly decreasing the energy efficiency of the combustion while having fumes containing at least 90 vol. % $CO_2$, or to produce synthesis gas, again with an improved energy efficiency.

We have discovered that chemical looping combustion can be advantageously used for upgrading the unconverted residue from an enhanced heavy crude recovery process and improving the energy efficiency of the method, while allowing capture of the $CO_2$ emitted.

DESCRIPTION OF THE INVENTION

Objects of the Invention

The invention relates to a method of preparing a synthetic crude from a heavy crude reservoir, comprising a stage of combustion and/or gasification of the conversion residue in the presence of metallic oxides, in at least one chemical looping cycle producing $CO_2$-rich fumes (i.e. contents above 90%), allowing to facilitate capture of the $CO_2$ emitted.

SUMMARY OF THE INVENTION

The invention relates to a method of preparing a synthetic crude from a heavy crude reservoir, comprising:
 a) extracting the heavy crude oil by means of a technology using steam;
 b) separating the crude extracted and the water;
 c) separating the crude into at least one light cut and one heavy cut;
 d) converting the separated heavy cut to a lighter product, referred to as converted product, and a residue;
 e) optionally, partially or totally hydroprocessing the converted product and/or the light cut(s) obtained upon separation (c);
 f) burning and/or gasifying the conversion residue in the presence of metallic oxides in at least one chemical looping cycle producing fumes with a $CO_2$ content above 90% allowing $CO_2$ capture; the optionally hydroprocessed converted product and light separation cut(s) making up the synthetic crude oil; said chemical looping combustion allowing to generate steam and/or electricity, and said chemical looping gasification allowing to generate hydrogen; the steam and/or the electricity thus generated being used for extraction (a), and/or the electricity and/or the hydrogen thus generated being used for conversion (d) and/or hydroprocessing (e).

The chemical looping cycle preferably produces fumes having a $CO_2$ content above 95%.

Preferably, the $CO_2$ capture ratio in the chemical loop (corresponding to the percentage of $CO_2$ emitted by the chemical looping combustion of stage (f) and leaving in form of fumes with a $CO_2$ content above 90%) is at least 90%.

Conversion d) can be carried out by coking, visbreaking or catalytic hydroconversion.

The conversion rate of conversion method d) can be adjusted so that chemical looping combustion and gasification f) allow to generate at least 50% of the amount of steam required for extraction a) or at least 50% of the amount of hydrogen required for conversion d) and optionally hydroprocessing e).

The conversion rate of conversion method d) can be adjusted so that chemical looping combustion and gasification f) allow to generate all of the steam required for extraction a) or all of the hydrogen required for conversion d) and optionally hydroprocessing e).

The conversion rate of conversion method d) can also be adjusted so that chemical looping combustion and gasification f) allow to generate all of the steam required for extraction a) and at least 50% of the amount of hydrogen required for conversion d) and optionally hydroprocessing e).

The conversion rate of conversion method d) can be adjusted so that chemical looping combustion and gasification f) allow to generate all of the steam required for extraction a) and all of the hydrogen required for conversion d) and optionally hydroprocessing e).

The conversion rate of conversion method d) can in this case also be adjusted so that chemical looping combustion and gasification f) allow to generate all of the steam required for extraction a), all of the hydrogen required for conversion d) and optionally hydroprocessing e), and all of the electricity required for extraction a) and conversion d), and optionally hydroprocessing e).

In an embodiment, gasification of the residue is carried out in stage f) and the conversion rate of conversion method d) is adjusted so that chemical looping gasification f) allows to generate at least 50% of the hydrogen required for conversion d) and optionally for hydroprocessing e), and optionally at least pad of the electricity required for extraction a) and for conversion d), and optionally hydroprocessing e).

The conversion rate of conversion method d) can then be adjusted so that chemical looping gasification f) allows to generate all of the hydrogen required for conversion d) and optionally hydroprocessing e).

Conversion d) can comprise thermal conversion or catalytic conversion.

In an embodiment, the thermal conversion is coking, visbreaking or hydrovisbreaking.

In another embodiment, the catalytic conversion is catalytic hydroconversion.

Extraction a) can be conducted according to a steam-assisted gravity drainage method (SAGD) or to a cyclic steam stimulation method (CSS).

Preferably, the heavy crude has a viscosity above 100 cPo and a density below 20° API, more preferably a viscosity above 1000 cPo and a density below 15° API, and most preferably a viscosity above 10,000 cPo and a density below 12° API.

Preferably, the synthetic crude obtained has a density of at most 0.94 under standard conditions and of at least 19° API, the viscosity being below 350 cSt at 4° C.

DETAILED DESCRIPTION

The invention provides integration of one or more chemical loops in a heavy oil production and upgrading scheme in order to maximize the energy efficiency of the assembly while producing fumes containing at least 90 vol. % $CO_2$ for later $CO_2$ capture and storage.

Preferably, the $CO_2$ capture ratio in the chemical loop, which corresponds to the $CO_2$ emitted by the chemical looping combustion and leaving in form of $CO_2$-concentrated fumes (i.e. having a $CO_2$ content above 90%, more preferably above 95%), is above 90%.

Due to the combustion of the chemical looping conversion residue, energy in form of steam or electricity is generated in amounts suited to meet all or part of the needs for the extraction stage and/or also the conversion stage and optionally the hydroprocessing stage and, due to gasification, hydrogen is also generated by the chemical loop in amounts suited to meet all or part of the needs for the conversion stage and optionally the hydroprocessing stage.

There are thus advantageously two chemical looping units, one dedicated to combustion of the residue and the other dedicated to the production of synthesis gas ($CO+H_2$) or hydrogen. These two units can optionally be integrated with one another.

Chemical Looping Combustion

Chemical looping combustion consists in contacting a hydrocarbon feed with a metallic oxide at high temperature in order to achieve combustion and/or gasification thereof. The metallic oxide then yields part of the oxygen it contains, which takes part in the combustion of the hydrocarbons. After this combustion, the fumes contain predominantly carbon oxides, water and possibly hydrogen. In fact, it is not necessary to contact the air with the hydrocarbons, and the fumes are then predominantly made up of combustion gases and possibly of a dilution gas used for transport and fluidization of the particles (steam for example). It is thus possible to produce predominantly nitrogen-free fumes with high $CO_2$ contents (above 90 vol. %) allowing to consider $CO_2$ capture, then storage. The metallic oxide that has taken part in the combustion is then transported to another reaction enclosure where it is contacted with air in order to be re-oxidized. If the particles from the combustion zone are free of fuel, the gases coming from this reaction zone are predominantly free of $CO_2$—which is then present only as traces, for example at concentrations below 1 to 2 vol. %—and they essentially consist of oxygen-depleted air, as a result of the oxidation of the metallic particles.

The metallic oxides usable for chemical looping combustion are generally Fe, Ti, Ni, Cu, Mg, Mn, Co, V oxides, used alone or in admixture. These metals can come in form of natural ores (ilmenite) or deposited on a synthetic support or on a used catalyst. Preferably, these solids are conditioned in powder form, with a Sauter diameter preferably ranging between 30 and 500 microns, more preferably between 50 and 300 microns, and a grain density ranging between 1400 and 8000 $kg/m^3$, preferably between 1400 and 5000 $kg/m^3$.

The feeds usable for chemical looping combustion are generally hydrocarbons such as natural gas, liquid petroleum feeds, preferably petroleum residues characterized by the fact that less than 10% of these residues boil under atmospheric conditions above 350° C., or conversion residues, generally resulting from hydroconversion processes or asphalts, deasphalting residues, or the coke resulting from coking processes.

Contacting between the hydrocarbon feed and the metallic oxide requires a residence time for the latter ranging between 10 seconds and 10 minutes depending on the temperature that can range between 800° C. and 1200° C., preferably between 1 minute and 5 minutes.

The contact time between the air and the metallic oxide providing optimum oxidation ranges between 10 seconds and 10 minutes depending on the temperature that can range between 800° C. and 1200° C., preferably between 1 minute and 5 minutes.

The mass ratio between the hydrocarbon feed to be burned and the circulating metallic oxide ranges between 5 and 500, preferably between 20 and 200, and it depends on the oxide used in the chemical loop.

Implementing a chemical looping combustion method requires large amounts of metallic oxide in contact with the fuel. These metallic oxides are generally contained either in ore particles, or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel oxide for example) have been deposited. Depending on the metallic oxides used, the amount of oxygen theoretically available varies considerably and it can reach high values close to 30%. However, according to the materials, the maximum capacity of oxygen really available does generally not exceed more than 20% of the oxygen present. The capacity of these materials to yield oxygen does therefore globally not exceed more than some percents by weight of the particles and it varies considerably from one oxide to another, generally ranging from 0.1 to 10%, often between 0.3 and 1 wt. %. Implementation with a fluidized bed is therefore particularly advantageous for conducting the combustion. In fact, the finely divided oxide particles circulate more readily in the combustion and oxidation reaction enclosures, and between these enclosures, if the properties of a fluid are conferred on the particles (fluidization).

Chemical looping combustion allows to produce energy, in form of vapour or electricity for example. The feed combustion heat is similar to that encountered in conventional combustion. It corresponds to the sum of the combustion and oxidation heats in the chemical loop. The distribution among the combustion and oxidation heats greatly depends on the metallic oxides used for conducting the chemical looping combustion. In some cases, the exothermicity is distributed among the oxidation and the reduction of the metal. In other cases, the oxidation is highly exothermic and the reduction is endothermic. In any case, the sum of the oxidation and reduction heats is equal to the combustion heat of the fuel. The heat is extracted by exchangers arranged inside, on the wall or added to the combustion and/or oxidation enclosures, on the fume lines or on the metallic oxide transfer lines.

Optimized Enhanced Heavy Crude Recovery Method

In the optimized method according to the invention comprising at least one chemical looping cycle as described above, energy in form of steam or electricity is generated in amounts suited to meet all or part of the needs for the extraction stage and/or also the conversion stage and optionally the hydroprocessing stage, and hydrogen is also generated by chemical looping in amounts suited to meet all or part of the needs for the conversion stage and optionally the hydroprocessing stage.

Advantageously, one chemical looping unit is dedicated to combustion of the residue and the other is dedicated to the production of synthesis gas ($CO+H_2$), which can later serve as a basis for hydrogen formation. These two units can optionally be integrated with one another.

The method according to the invention thus allows to avoid using natural gas conventionally used for steam and hydrogen generation, to use the conversion residue in order to produce the energy required for crude production with an energy efficiency similar to the efficiency that would have been obtained in a conventional air combustion method, but while producing combustion fumes containing at least 90 vol. % $CO_2$, and to use the conversion residue to also produce a synthesis gas and hydrogen without using an air separation unit.

The method thus allows, from a heavy crude, to produce a crude usable in refineries to produce fuels, while making it possible to capture the $CO_2$ resulting from the production energy needs.

Using the conversion residue to produce steam and/or hydrogen and/or electricity can also result in substantial savings in the investment required for the conversion facilities. In fact, the capacities of the conversion facilities can be limited, on the one hand, by the fact that the conversion residue can also be used to generate steam and/or electricity and/or hydrogen and, on the other hand, by the fact that the required conversion level can be limited, and the conversion operating conditions can then be less severe (notably residence time reduction).

Thus, according to an advantageous embodiment of the method of the invention, the conversion rate of conversion d) is adjusted so that combustion and gasification f) allow to generate at least 50% of the amount of steam required for extraction a) or at least 50% of the amount of hydrogen required for conversion d) and optionally hydroprocessing e), preferably all of the steam required for extraction a) or all of the hydrogen required for conversion d) and optionally hydroprocessing e), more preferably all of the steam required for extraction a) and at least 50%, preferably 100% of the amount of hydrogen required for conversion d) and optionally hydroprocessing e), still more preferably all of the steam required for extraction a) and all of the hydrogen required for conversion d) and optionally hydroprocessing e), and the electricity required for extraction a) and conversion d), and optionally hydroprocessing e).

In another embodiment, gasification of the residue is carried out in stage f) and the conversion rate of conversion d) is adjusted so that gasification allows to generate at least 50% of the amount of hydrogen, preferably all of the hydrogen required for conversion d) and optionally for hydroprocessing e), and at least part of the electricity required for extraction a) and for conversion d), and optionally hydroprocessing e).

In the present invention, the "raw conversion rate" is defined as the mass ratio of:
the difference between the feed entering the upgrading stage and the residue obtained
to the incoming feed.

The "T540$^+$ conversion rate" is defined as the ratio of:
the difference between the amount of product of boiling point greater than or equal to 540° C. entering the reactor and the amount of product of boiling point greater than or equal to 540° C. leaving the reactor
to the amount of product of boiling point greater than 540° C. entering the reactor,
the amounts being expressed in mass.

In the method according to the invention, extraction a) is preferably carried out according to a steam-assisted gravity drainage or SAGD technology or to a cyclic steam stimulation or CSS technology, i.e. technologies requiring very large amounts of steam and therefore of energy.

In the method according to the invention, separation c) implements at least one physical separation method such as solvent extraction or distillation.

Distillation can be atmospheric pressure distillation or atmospheric pressure distillation followed by vacuum distillation. Atmospheric distillation can also be followed by deasphalting, i.e. solvent extraction separation.

The asphaltene-containing heavy fraction resulting from these separation operations is then upgraded so as to give lighter products.

Conversion d) can be thermal (coking, visbreaking) or catalytic (catalytic hydroconversion).

Coking

Advantageously, in the method according to the invention, coking is applied to the heavy fraction of a vacuum residue. The coking conditions are as follows: the temperature at the furnace outlet is above 460° C., preferably ranging from 480° C. to 510° C., the absolute pressure in the furnace is below 5 bars, preferably ranging from 1 to 3 bars, the recycling rate, i.e. the stream fraction that has undergone coking (stream 45 in FIG. 3) returning to the coking furnace after fractionation is less than 20%, preferably less than 10%. These operating conditions can be degraded in order to produce a little more coke if necessary for the production of steam for SAGD extraction or of hydrogen.

The coke produced corresponds to 20% to 35% of the feed entering the coking unit depending on the nature of the feed and on the operating conditions, which corresponds to a raw conversion rate of the coking product of 65 to 80%. If this raw conversion rate is insufficient to meet all of the steam and hydrogen and/or electricity needs, a cut, preferably a heavy cut from the coker, can also be used to supplement the amount of fuel.

Visbreaking

This thermal conversion unit can also be a visbreaking unit. Visbreaking can also be carried out in the presence of hydrogen so as to promote the stability of the products. It is then referred to as hydrovisbreaking. T540$^+$ conversions of 25% to 45% can be obtained. This unit comprises at least one cracking furnace section and one cracked product fractionation section. It preferably also comprises a maturation section. The feed entering the visbreaking unit, which can be an atmospheric residue or a vacuum residue, is passed into the cracking furnace section so as to bring the hydrocarbons to a temperature ranging between 430° C. and 510° C., preferably between 470° C. and 500° C. In the presence of the maturation section, this furnace outlet temperature can be lowered and it ranges between 440° C. and 470° C.

Catalytic Hydroconversion

According to another advantageous embodiment of the method of the invention, the catalytic conversion is a catalytic hydroconversion.

The catalytic conversion method can be an ebullated bed or a slurry hydroconversion method. The feed can be an atmospheric residue or a vacuum residue. The T540$^+$ conversion rate of this type of method can range from 20% to 95%.

This hydroconversion method preferably comprises at least one furnace section for preheating the feed and the hydrogen, a reaction section wherein conversion is carried out and a fractionation section wherein the reaction section effluent is separated into different cuts.

The operating conditions of the catalytic conversion reaction section are generally a total pressure of 10 to 500 bars, preferably 60 to 200 bars, a partial hydrogen pressure of 10 to 500 bars, preferably 60 to 200 bars, a temperature of 300° C. to 600° C., preferably 380° C. to 450° C., and a residence time of 5 min to 20 h, preferably 1 h to 10 h.

Preferably, the reaction section consists of at least one reaction enclosure wherein a gas phase, a liquid phase and a solid phase are contacted. The gas phase contains, in a variable proportion, at least hydrogen and hydrocarbons vaporized under the conditions of the method. The liquid phase consists of non-vaporized hydrocarbons. The solid phase contained in the reactor preferably has a catalytic action under the reaction conditions. The solid is preferably within the liquid phase.

In the ebullated bed embodiment, the method uses a supported catalyst containing at least one metallic element. The catalyst remains in the reactor and it is added or discharged independently of the feed.

In the slurry reactor embodiment, the catalyst is generally fed continuously with the fresh feed into the reactor and it consists of soluble elements containing one or more metals that can be sulfurized under the conditions of the method.

Sulfurization of the metals causes precipitation of the metal that dwells in the reactor in form of fine dispersed particles that can be entrained by the liquid out of the reaction zone.

Preferably, the solid catalyst particles contain molybdenum.

In cases where the conversion method uses particles in slurry mode, combustion and gasification of the residues is provided so as to allow the metals of the catalyst to be recovered in the ashes or the fumes. In fact, the catalyst used in hydroconversions in slurry reactors is concentrated after separation of the effluents in said residues.

The T540$^+$ conversion rate of this type of method can range from 20% to 95%.

According to an advantageous embodiment of the method of the invention, the T540$^+$ conversion rate of the catalytic hydroconversion is 65% to 85%, chemical looping combustion of the residue can then allow to produce the steam required for extraction a) or the hydrogen used for upgrading d) and optionally hydroprocessing e). If the conversion rate ranges from 50% to 70%, then the steam required for extraction a) and the hydrogen used for upgrading d) can both be produced.

After conversion d), the converted fractions obtained and/or the light fractions resulting from separation c) can be hydroprocessed in a stage e), i.e. enriched in hydrogen in the presence of catalysts, in order to stabilize them and to remove part of the heteroatoms. This hydroprocessing stage e) consumes hydrogen.

Crudes that can be Upgraded by the Method According to the Invention

The method according to the invention is intended for extraction and upgrading of extra-heavy crude type hydrocarbon fractions, i.e. having a viscosity above 100 cPo and a density below 20° API, preferably a viscosity above 1000 cPo and a density below 15° API and more preferably a viscosity above 10,000 cPo and a density below 12° API.

This method is thus particularly suited to heavy crudes such as those of Athabasca, Zuata, Cerronegro, or Morichal type.

The synthetic crude that is obtained at the end of the method according to the invention has a viscosity and a density such that it can be transported by pipeline, the density being at most 0.94 under standard conditions and at least 19° API, and the viscosity being below 350 cSt at 4° C. Furthermore, it contains reduced proportions of heteroatoms and metals.

LIST OF THE FIGURES

The method according to the invention is illustrated by way of non limitative example by FIGS. 1 to 3, wherein:

FIG. 1 diagrammatically shows the sequence of the various stages of the integrated method of preparing a synthetic crude from a heavy crude reservoir, FIG. 2 diagrammatically shows the processing stage that comprises separation c), conversion d) and optionally hydroprocessing e) with energy production by chemical looping combustion of at least part of the unconverted residue, FIG. 3 diagrammatically shows the processing stage that comprises separation c), conversion d) and optionally hydroprocessing e) with energy production by chemical looping combustion of at least part of the unconverted residue and chemical looping production of hydrogen also using part of the unconverted residue.

Figure 1:
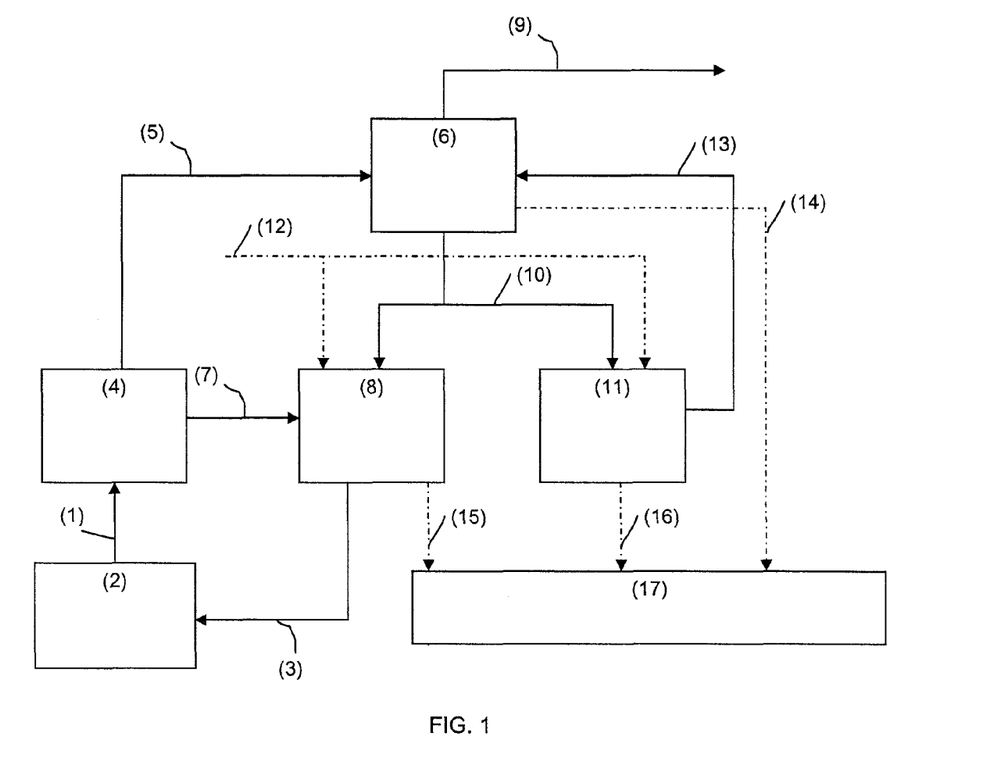

FIG. 1 shows all of the heavy crude extraction and upgrading units.

Block (2) represents the extraction that is performed with steam injected through a line (3). The steam injection through line (3) into extraction zone (2) produces, according to the SAGD or CSS process, a mixture of water and crude that leaves through a line (1) and is fed into a separation zone (4). The crude thus isolated is transferred through a line (5) to processing zone (6), and the water leaves through a line (7) in order to be recycled in steam generation zone (8) where it is processed and then vaporized after optional water supply and recycled to extraction zone (2).

In processing zone (6), the crude is treated by (i) separation, (ii) hydroconversion and (iii) optionally hydroprocessing, thus allowing to obtain, on the one hand, synthetic crude that is carried through a line (9) to other development zones using pipelines, and, on the other hand, a non-upgradable residue that flows out through a line (10) and is burned so as to generate steam in steam generation zone (8) and/or that is gasified so as to generate hydrogen in gasification zone (11). This generation of steam and hydrogen is done either by chemical looping combustion or chemical looping gasification of the residue leaving through line (10) or by chemical looping combustion or gasification of the residue leaving through line (10) and supply of natural gas through a line (12). In the case of natural gas supply, the hydrogen can be produced either by means of a conventional method (steam reforming) or using methods involving chemical looping partial combustion. These hydrogen generation methods are supplemented by separation/purification sections for the hydrogen-containing gas produced in order to meet the needs of the crude upgrading methods in processing zone (6).

The natural gas can in fact be advantageously used to start the production facilities during transition stages. It can be noted that chemical looping combustion or gasification of natural gas also allows to produce nitrogen-free combustion fumes that contain, after steam condensation, more than 90 vol. % $CO_2$.

The steam generated by chemical looping combustion in steam generation zone (8) is sent via a line (3) to extraction zone (2). The hydrogen produced is sent through a line (13) to processing zone (6). The carbon dioxide formed in processing zone (6), steam generation zone (8) and hydrogen formation zone (11) can then be compressed and sent to a storage site (re-injection into a saline aquifer or into a crude reservoir already under development for example).

The carbon dioxide that is formed in processing zone (6), steam generation zone (8) and hydrogen formation zone (11) is sent via lines (14), (15), (16) respectively to a carbon dioxide recovery zone (17) containing, for example, a $CO_2$ selective absorption/desorption zone using amines, then a $CO_2$ storage section.

Figure 2:
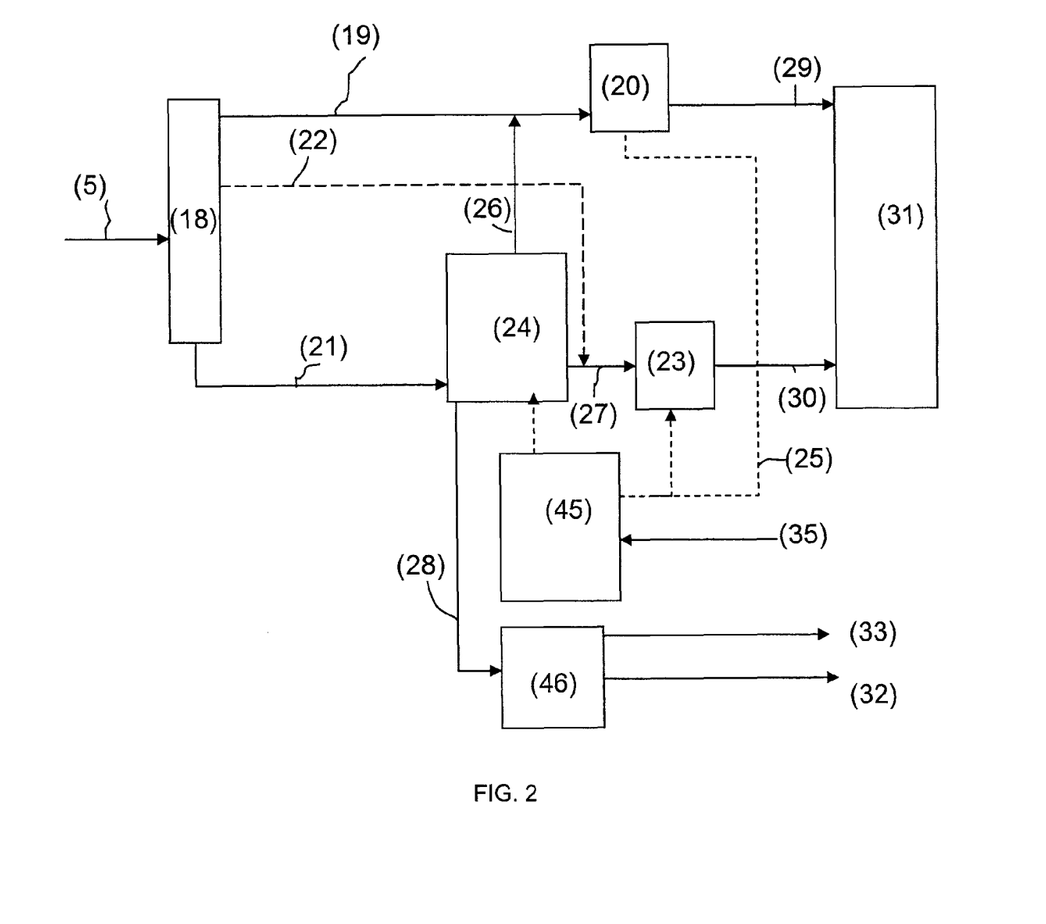

Processing zone (6) is described more in detail by means of FIG. 2. The heavy crude obtained from the production by SAGD or CSS feeds a separation unit (18) through a line (5). At least one light fraction is sent through a line (19) at the top of this separation unit (18) to a hydroprocessing unit (20) and the heavy fraction is collected at the bottom of column (21). Part of the light fraction(s) can optionally be sent to separation zone (4) and mixed with the crude so as to facilitate its transport upstream from the separation. Separation unit (18) can be an atmospheric distillation column, the light fraction(s) is (are) then referred to as atmospheric residue (ATR). It can also consist of an atmospheric distillation column and of a vacuum distillation column. In this case, the heavy fraction from the atmospheric distillation column feeds the vacuum distillation column (not shown), and the heavy fraction obtained is referred to as vacuum residue (VR).

Separation unit (18) can also consist of an atmospheric distillation column followed by a deasphalting unit. In this case, the atmospheric distillates are recovered at the top of the distillation column via line (19) and sent to hydroprocessing unit (20), and the atmospheric distillation heavy fraction feeds the deasphalting unit (not shown). The deasphalting residue, referred to as asphalt, then feeds line (21) described in FIG. 2. The deasphalted oil (DAO) feeds line (22) in FIG. 2.

The light fractions, or atmospheric distillates, essentially consist of naphtha, kerosene and gas oil.

The heavy fraction resulting from the separation leaves through line (21) and it is processed in heavy cut conversion unit (24). This unit can be a thermal conversion unit. When this conversion requires hydrogen supply (catalytic conversion), the hydrogen can be delivered through line (25).

This conversion in heavy cut conversion unit (24) leads to produce different fractions ranging from light fractions to so-called heavy residue fractions. The stream flowing in through line (26) represents the light fraction that essentially contains the naphtha, kerosene and gas oil type products from the conversion process (24). The stream flowing in through line (27) contains a heavier fraction that represents the vacuum distillate, and the stream flowing in through line (28) contains the residue obtained from conversion unit (24).

The naphtha, kerosene, and gas oil cuts of the streams flowing in through lines (19) and (26) are mixed and they can feed hydroprocessing unit (20) that allows to improve the quality of these cuts by reducing the sulfur and nitrogen content while stabilizing these products. The stream flowing in through line (29) represents the hydroprocessed naphtha, kerosene and gas oil cut obtained from hydroprocessing unit (20).

The vacuum distillate cut coming through a line (27) from conversion unit (24) and optionally the vacuum distillate leaving through a line (22) (which exists when the separation section comprises a vacuum distillation) are fed into deep hydroprocessing unit (23) so as to undergo deep hydroprocessing and to reduce the proportion of heteroatoms such as sulfur and nitrogen. The stream from line (30) represents the vacuum distillate cut after hydroprocessing in deep hydroprocessing unit (23).

The streams from lines (29) and (30) are mixed in synthetic crude generation zone (31).

The steam from line (32), the electricity (33) and the hydrogen from line (25) can be produced from the natural gas coming from a line (35). The steam and optionally the electricity are produced in a chemical looping combustion facility (46) providing combustion of the residue coming from conversion unit (24) through a line (28). The hydrogen is produced by a steam methane reforming unit (45) supplied with natural gas through a line (35).

Figure 3:
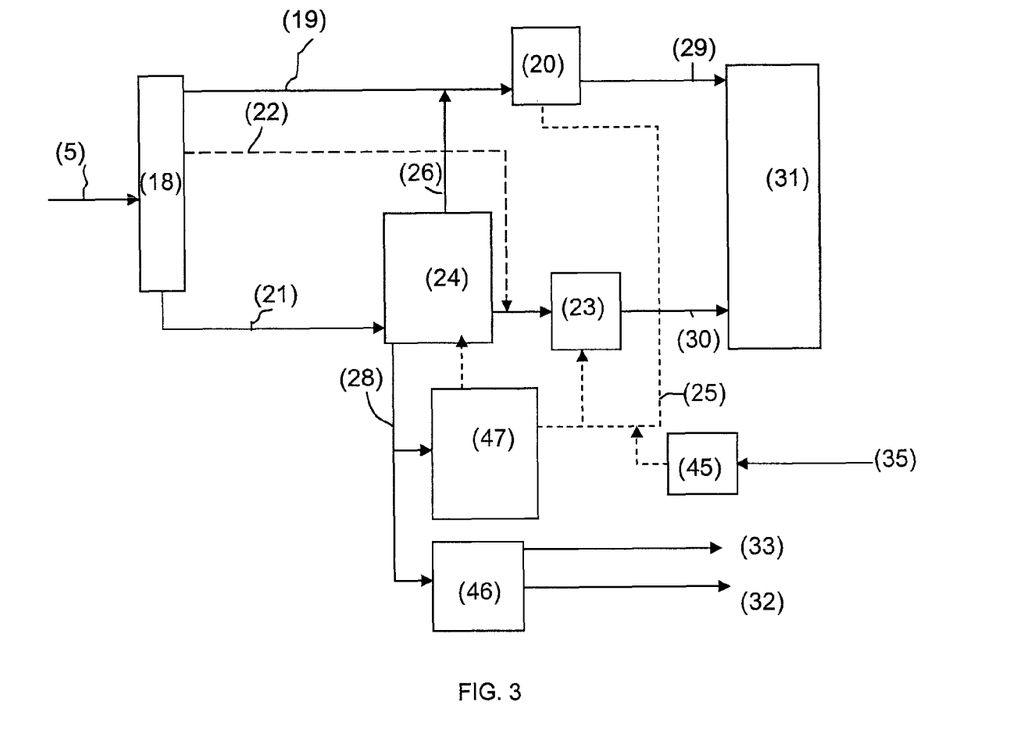

FIG. 3 shows a variant of FIG. 2 wherein all or part of the natural gas needs for hydrogen production are overcome by adjusting the conversion level of conversion unit (24) to produce enough residue through a line (28) in order to produce, through a line (25), all or part of the hydrogen required for hydroprocessing, in chemical looping gasification unit (47), of the conversion residue flowing in through line (28), and the rest of the hydrogen produced can come from a steam methane reforming unit (45) supplied by a natural gas line (35). In FIG. 3, steam (32) and optionally the electricity are produced in a chemical looping combustion facility (46) providing combustion of the residue from line (28).

The steam from line (32) can be produced by combustion in chemical looping combustion zone (46) or by gasification of the residue in chemical looping gasification zone (47). The steam generated can be partly fed into a turbine so as to produce electricity leaving through line (33) or the synthesis gas produced by gasification can be partly fed into a gas turbine so as to produce electricity leaving through line (33).

Hydrogen (25) can be produced by chemical looping gasification of the residue from line (28). Part of the synthesis gas produced can then be fed into a gas turbine so as to produce the electricity leaving through line (33).

The hydrogen produced is then fed to hydroprocessing units (20) and (23) and optionally to conversion unit (24) if necessary via line (25).

The steam generated is sent to the petroleum reservoir where it will provide heating of the crude oil, thus decreasing the viscosity thereof.

Conversion unit (24) can be either a thermal conversion unit (using for example delayed coking, fluidized-bed coking, visbreaking or hydrovisbreaking, etc.) or a catalytic conversion unit (for example fixed-bed, moving-bed, ebullated-bed or entrained slurry reactor catalytic residue hydroconversion).

Other features and advantages of the invention will be clear from reading the description hereafter of examples and of a comparative example given by way of non-limitative illustration.

EXAMPLES

Example 1

Standard Combustion and Hydrogen Production Using Steam Reforming

Athabasca type heavy or bituminous crude is withdrawn via SAGD. After separation of the water and of the crude, the crude is subjected to atmospheric distillation. The atmospheric residue (ATR) obtained has the characteristics given in Table 1 below. This atmospheric residue undergoes hydroconversion.

The hydroconversion conversion rate is adjusted so as to have the necessary amount of residue (500° C.+) in order to supply a conventional boiler supplied with residue and air for producing the steam required for heavy or bituminous crude production.

In order to produce 100,000 bpsd heavy crude or bitumen via SAGD, knowing that the steam/produced crude ratio is two barrels of steam to one barrel of crude, it will be necessary to inject into the ground approximately 1350 t/h steam.

In order to meet this demand for steam, the hydroconversion conversion level should lead to have 123,000 kg/h residue for supplying the boiler. The conversion rate therefore has to be 78%.

The hydroconversion conditions thus are as follows:

Mean temperature: 421° C.

Partial $H_2$ pressure: 130 bar

T540 conversion: 0.78.

The hydrogen supply for upgrading is an outside supply of hydrogen obtained by steam methane reforming of natural gas. 19 t/h of hydrogen are necessary, which corresponds to a consumption of 66 t/h of natural gas.

The characteristics of the crude after hydroconversion are given in Table 1 below.

The material balance of the hydroconversion is as follows:

|  | Wt. % |
|---|---|
| ATR | 100.0 |
| $H_2$ | 2.69 |
| $NH_3$ | 0.19 |
| $H_2S$ | 5.04 |
| $C_1$-$C_4$ | 5.85 |
| $C_5$-370 | 47.05 |
| 370-500 | 21.01 |
| 500+ | 20.85 |
| Total | 102.69 |

The light cut resulting from atmospheric distillation and the product that has undergone hydroconversion are mixed after hydroprocessing to provide the synthetic crude whose characteristics are given in Table 1 below.

TABLE 1

|  | D4.15 | ° API | S (by weight) |
|---|---|---|---|
| ATR | 1.029 | 6.0 | 5.42% |
| After hydroconversion | 0.89 | 27.7 | 0.74% |
| Synthetic crude | 0.83 | 39.2 | 380 ppm |

90,500 bpsd of synthetic crude at 39.2° API were produced with a natural gas consumption of 66 t/h.

The amount of $CO_2$ emitted by the boiler is 387,000 kg/h diluted in fumes essentially containing nitrogen and steam, the $CO_2$ volume concentration being close to 14 vol. %. The nitrogen and sulfur oxides were collected upstream from the combustion fumes discharge using conventional methods known to the person skilled in the art.

Example 2

Standard Oxycombustion and Hydrogen Production Using Steam Reforming

Athabasca type heavy or bituminous crude is withdrawn via SAGD. After separation of the water and of the crude, the crude is subjected to atmospheric distillation. The atmospheric residue (ATR) obtained has the characteristics given in Table 2 below. This atmospheric residue undergoes hydroconversion, The hydroconversion conversion rate is adjusted so as to have the necessary amount of residue (500° C.+) in order to supply a boiler operating under oxycombustion conditions supplied with residue and oxygen for producing the steam required for heavy or bituminous crude production.

In order to produce 100,000 bpsd heavy crude or bitumen via SAGD, knowing that the steam/produced crude ratio is two barrels of steam to one barrel of crude, it will be necessary to inject into the ground approximately 1350 t/h steam.

In order to meet this demand for steam, the hydroconversion conversion level should lead to have 147,000 kg/h residue for supplying the boiler. In fact, the energy efficiency of the oxycombustion system is lower than that of a conventional combustion boiler.

The conversion rate can then be lowered to 73%.
The hydroconversion conditions thus are as follows:
Mean temperature: 417° C.
Partial $H_2$ pressure: 130 bar
T540 conversion: 0.73.

The hydrogen supply for upgrading is an outside supply of hydrogen obtained by steam methane reforming of natural gas. 18.3 t/h of hydrogen are necessary, which corresponds to a consumption of 64 t/h of natural gas.

The characteristics of the crude after hydroconversion are given in Table 2 below.

The material balance of the hydroconversion is as follows:

|  | Wt. % |
|---|---|
| ATR | 100.0 |
| $H_2$ | 2.59 |
| $NH_3$ | 0.19 |
| $H_2S$ | 4.98 |
| $C_1$-$C_4$ | 5.73 |
| $C_5$-370 | 46.20 |
| 370-500 | 20.53 |
| $500^+$ | 22.27 |
| Total | 102.69 |

The light cut resulting from atmospheric distillation and the product that has undergone hydroconversion are mixed after hydroprocessing to provide the synthetic crude whose characteristics are given in Table 2 below.

TABLE 2

|  | D4.15 | ° API | S (by weight) |
|---|---|---|---|
| ATR | 1.029 | 6.0 | 5.42% |
| After hydroconversion | 0.89 | 27.7 | 0.77% |
| Synthetic crude | 0.825 | 39.3 | 392 ppm |

85,200 bpsd of synthetic crude at 39.3° API were produced with a natural gas consumption of 64 t/h.

The amount of $CO_2$ emitted by the boiler is 463,000 kg/h concentrated through the implementation of the oxycombustion process, the $CO_2$ volume concentration being close to 95 vol. %. The nitrogen and sulfur oxides were collected upstream from the combustion fumes discharge using conventional methods known to the person skilled in the art.

Example 3

Chemical Looping Combustion and Hydrogen Production Using Steam Reforming

Athabasca type heavy or bituminous crude is withdrawn via SAGD. After separation of the water and of the crude, the crude is subjected to atmospheric distillation. The atmospheric residue (ATR) obtained has the characteristics given in Table 3 below. This atmospheric residue undergoes hydroconversion.

The hydroconversion conversion rate is adjusted so as to have the necessary amount of residue (500° C.+) in order to supply a boiler operating with a chemical loop and supplied with residue. The material used for operating the chemical loop is ilmenite. The temperature of the combustion zone is 995° C.

In order to produce 100,000 bpsd heavy crude or bitumen via SAGD, knowing that the steam/produced crude ratio is two barrels of steam to one barrel of crude, it will be necessary to inject into the ground approximately 1350 t/h steam.

In order to meet this demand for steam, the hydroconversion conversion level should lead to have 125,000 kg/h residue for supplying the boiler. In fact, the energy efficiency of the chemical looping combustion system is nearly as good as that of a conventional combustion boiler and in particular much better than that of an oxycombustion boiler.

The conversion rate can then be lowered to 77%.
The hydroconversion conditions thus are as follows:
Mean temperature: 417° C.
Partial $H_2$ pressure: 130 bar
T540 conversion: 0.77.

The hydrogen supply for upgrading is an outside supply of hydrogen obtained by steam methane reforming of natural gas. 18.7 t/h of hydrogen are necessary, which corresponds to a consumption of 65 t/h of natural gas.

The characteristics of the crude after hydroconversion are given in Table 3 below.

The material balance of the hydroconversion is as follows:

|  | Wt. % |
|---|---|
| ATR | 100.0 |
| $H_2$ | 2.65 |
| $NH_3$ | 0.19 |
| $H_2S$ | 5.02 |

-continued

| | Wt. % |
|---|---|
| $C_1$-$C_4$ | 5.81 |
| $C_5$-370 | 46.85 |
| 370-500 | 21.01 |
| 500+ | 21.01 |
| Total | 102.65 |

The light cut resulting from atmospheric distillation and the product that has undergone hydroconversion are mixed after hydroprocessing to provide the synthetic crude whose characteristics are given in Table 3 hereafter.

TABLE 3

| | D4.15 | ° API | S (by weight) |
|---|---|---|---|
| ATR | 1.029 | 6.0 | 5.42% |
| After hydroconversion | 0.89 | 27.7 | 0.77% |
| Synthetic crude | 0.825 | 39.25 | 392 ppm |

90,000 bpsd of synthetic crude at 39.2° API were produced with a natural gas consumption of 65 t/h.

The amount of $CO_2$ emitted by the boiler is 394,000 kg/h concentrated through the implementation of the chemical looping combustion process, the $CO_2$ volume concentration being close to 97 vol. %. The nitrogen and sulfur oxides were collected upstream from the combustion fumes discharge using conventional methods known to the person skilled in the art.

The comparison of the three combustion modes for producing the energy required for an enhanced heavy crude recovery process is given in Table 4:

TABLE 4

| | Synthetic crude produced (BPD) | $CO_2$ emitted (kg/h) | Vol. % $CO_2$ of the fumes | Natural gas used to produce the $H_2$ |
|---|---|---|---|---|
| Conventional combustion | 90,500 | 387,000 | 15 | 66 |
| Oxycombustion | 85,200 | 463,000 | 95 | 64 |
| Chemical looping combustion | 90,000 | 394,000 | 97 | 65 |

The chemical loop allows to produce combustion fumes at least as $CO_2$-concentrated as with oxycombustion. On the other hand, the chemical loop allows to produce approximately 5000 more bpd than oxycombustion, i.e. to be at the same level as conventional combustion methods, which however do not allow to concentrate the fumes in $CO_2$. This improved production, associated with a high $CO_2$-concentration of the fumes, is linked with the higher efficiency of the energy cycle used in the chemical looping combustion method.

The invention claimed is:

1. A method of preparing a synthetic crude from a heavy crude reservoir, comprising:
   a) extracting the heavy crude oil by means of a technology using steam;
   b) separating the crude extracted and the water;
   c) separating the crude into at least one light cut and one heavy cut;
   d) converting the separated heavy cut to a lighter product, referred to as converted product, and a residue;
   e) optionally, partially or totally hydroprocessing the converted product and/or the light cut(s) obtained upon separation (c);
   f) burning and/or gasifying the conversion residue in the presence of metallic oxides in at least one chemical looping cycle producing fumes with a $CO_2$ content above 90 vol. % in order to allow $CO_2$ capture; said chemical looping combustion allowing to generate steam and/or electricity, and said chemical looping gasification allowing to generate hydrogen; the steam and/or the electricity thus generated being used for extraction (a), and/or the electricity and/or the hydrogen thus generated being used for conversion (d) and/or hydroprocessing (e).

2. A method as claimed in claim 1, wherein the chemical looping cycle produces fumes having a $CO_2$ content above 95 vol. %.

3. A method as claimed in claim 1, wherein a percentage of $CO_2$ emitted by the chemical looping combustion of stage (f) and leaving in the form of fumes with a $CO_2$ content above 90 vol. %.

4. A method as claimed in claim 1, wherein conversion d) is carried out by coking, visbreaking or catalytic hydroconversion.

5. A method as claimed in claim 1, characterized in that the conversion rate of conversion method d) is adjusted so that chemical looping combustion and gasification f) allow to generate at least 50% of the amount of steam required for extraction a) or at least 50% of the amount of hydrogen required for conversion d) and optionally hydroprocessing e).

6. A method as claimed in claim 1, characterized in that the conversion rate of conversion method d) is adjusted so that chemical looping combustion and gasification f) allow to generate all of the steam required for extraction a) or all of the hydrogen required for conversion d) and optionally hydroprocessing e).

7. A method as claimed in claim 1, characterized in that the conversion rate of conversion method d) is adjusted so that chemical looping combustion and gasification f) allow to generate all of the steam required for extraction a) and at least 50% of the amount of hydrogen required for conversion d) and optionally hydroprocessing e).

8. A method as claimed in claim 7, characterized in that the conversion rate of conversion method d) is adjusted so that chemical looping combustion and gasification f) allow to generate all of the steam required for extraction a) and all of the hydrogen required for conversion d) and optionally hydroprocessing e).

9. A method as claimed in claim 8, characterized in that the conversion rate of conversion method d) is adjusted so that chemical looping combustion and gasification f) allow to generate all of the steam required for extraction a), all of the hydrogen required for conversion d) and optionally hydroprocessing e), and all of the electricity required for extraction a) and conversion d), and optionally hydroprocessing e).

10. A method as claimed in claim 1, characterized in that gasification of the residue is carried out in stage f) and the conversion rate of conversion method d) is adjusted so that chemical looping gasification f) allows to generate at least 50% of the hydrogen required for conversion d) and optionally for hydroprocessing e), and optionally at least part of the electricity required for extraction a) and for conversion d), and optionally hydroprocessing e).

11. A method as claimed in claim 10, characterized in that the conversion rate of conversion method d) is adjusted so that chemical looping gasification f) allows to generate all of the hydrogen required for conversion d) and optionally hydroprocessing e).

12. A method as claimed in claim 1, characterized in that conversion d) comprises a thermal conversion or a catalytic conversion.

13. A method as claimed in claim 12, characterized in that the thermal conversion is coking, visbreaking or hydrovisbreaking.

14. A method as claimed in claim 12, characterized in that the catalytic conversion is a catalytic hydroconversion.

15. A method as claimed in claim 1, wherein extraction a) is conducted according to a steam-assisted gravity drainage method (SAGD) or to a cyclic steam stimulation method (CSS).

16. A method as claimed in claim 1, characterized in that the heavy crude has a viscosity above 100 cPo and a density below 20° API.

17. A method as claimed in claim 16, characterized in that the heavy crude has a viscosity above 1000 cPo and a density below 15° API.

18. A method as claimed in claim 17, characterized in that the heavy crude has a viscosity above 10,000 cPo and a density below 12° API.

19. A method as claimed in claim 1, characterized in that a synthetic crude comprising the at least one light cut and the converted product and optionally the hydroprocessed converted product and/or the light cut(s) obtained upon separation (c) has at least 19° API, the viscosity being below 350 cSt at 4° C.

* * * * *